US012322413B2

(12) United States Patent
Mitsunari et al.

(10) Patent No.: US 12,322,413 B2
(45) Date of Patent: Jun. 3, 2025

(54) BASE PLATE AND DISK DRIVE DEVICE

(71) Applicant: NIDEC CORPORATION, Kyoto (JP)

(72) Inventors: Takashi Mitsunari, Kyoto (JP);
Michihiro Ito, Kyoto (JP); Kenta Miyoshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 84 days.

(21) Appl. No.: 18/509,213

(22) Filed: Nov. 14, 2023

(65) Prior Publication Data
US 2024/0170018 A1     May 23, 2024

(30) Foreign Application Priority Data
Nov. 18, 2022   (JP) .................... 2022-184564

(51) Int. Cl.
| G11B 33/14 | (2006.01) |
| G11B 19/20 | (2006.01) |
| G11B 25/04 | (2006.01) |
| G11B 33/02 | (2006.01) |

(52) U.S. Cl.
CPC ........ *G11B 19/2009* (2013.01); *G11B 25/043* (2013.01); *G11B 33/027* (2013.01); *G11B 33/1466* (2013.01)

(58) Field of Classification Search
None
See application file for complete search history.

(56) References Cited

U.S. PATENT DOCUMENTS

| 4,597,583 A * | 7/1986 | Inciong .................. F16J 15/121 277/637 |
| 5,080,252 A * | 1/1992 | Haga .................. G11B 33/1466 220/378 |
| 5,422,766 A * | 6/1995 | Hack .................. G11B 33/1466 360/99.18 |
| 5,957,464 A * | 9/1999 | Elliott .................... F16J 15/062 277/637 |
| 9,747,953 B1 * | 8/2017 | Shimomura ......... G11B 33/022 |
| 9,747,956 B1 * | 8/2017 | Kaneko .................... G06F 1/187 |
| 9,818,453 B1 * | 11/2017 | Lapp .................. G11B 33/1466 |
| 10,622,027 B1 * | 4/2020 | Kaneko .............. G11B 33/1466 |
| 10,910,018 B2 | 2/2021 | Terasaki et al. |

(Continued)

FOREIGN PATENT DOCUMENTS

| JP | 2019160378 | 9/2019 | |
| WO | WO-0221534 A1 * | 3/2002 | ........... G11B 33/121 |
| WO | WO-2006087948 A1 * | 8/2006 | ............. F16J 15/025 |

*Primary Examiner* — William J Klimowicz
(74) *Attorney, Agent, or Firm* — JCIPRNET (57) ABSTRACT

A base plate includes a support part, a bottom plate part, and a wall part. The wall part includes a first wall part and a second wall part above the first wall part. The first wall part includes a first wall surface and a support surface spreading from an upper end of the first wall surface to a radially outer side. The second wall part includes a second wall surface and a recess recessed to the radially outer side from the second wall surface. The recess is defined by a space enclosed by a recess wall surface located on the radially outer side of the second wall surface and extending upward from the support surface, a recess top surface connecting from an upper end of the recess wall surface to the second wall surface, and a recess support surface facing the recess top surface in an axial direction.

11 Claims, 7 Drawing Sheets

(56) References Cited

U.S. PATENT DOCUMENTS

| | | | |
|---|---|---|---|
| 2003/0179489 A1* | 9/2003 | Bernett | G11B 33/1466 360/97.22 |
| 2008/0165448 A1* | 7/2008 | Ichikawa | G11B 25/043 29/603.03 |
| 2014/0368948 A1* | 12/2014 | Okutani | G11B 33/1466 360/97.12 |
| 2019/0066716 A1* | 2/2019 | Suzuki | G11B 5/10 |
| 2019/0287573 A1* | 9/2019 | Terasaki | G11B 33/022 |
| 2022/0020399 A1* | 1/2022 | Arai | G11B 33/148 |

* cited by examiner

BASE PLATE AND DISK DRIVE DEVICE

CROSS REFERENCE TO RELATED APPLICATIONS

The present invention claims priority under 35 U.S.C. § 119 to Japanese Application No. 2022-184564 filed on Nov. 18, 2022 the entire content of which is incorporated herein by reference.

FIELD OF THE INVENTION

The disclosure relates to a base plate and a disk drive device.

BACKGROUND

Conventionally, disk drive devices such as hard disk drives are known. A disk drive device includes a motor and a head. The motor causes a disk to rotate. The head performs reading and writing of information from and to the disk. Further, the disk drive device includes a housing composed of a base plate and a cover part. The disk is arranged in a space enclosed by the base plate and the cover part.

In recent years, it has been considered to increase a disk diameter of the disk drive device. Upon increasing the disk diameter, a gap between an inner wall surface of the base plate and the disk in the radial direction of the disk becomes smaller, which leads to an increase in windage loss and thus an increase in power consumption.

However, if the inner wall surface of the base plate is shifted to the radially outer side to suppress windage loss, the width of a wall part upper surface of the base plate in the radial direction becomes smaller. Thus, in the case where the cover part is arranged on the wall part upper surface of the base plate, an arrangement space of the cover part on the wall part upper surface of the base plate becomes smaller in the radial direction. As a result, the sealing property may decrease between the base plate and the cover part. That is, airtightness of the housing including the base plate may decrease.

SUMMARY

A base plate according to an exemplary embodiment of the disclosure is a base plate which defines a part of a housing of a disk drive device. The base plate includes a support part, a bottom plate part, and a wall part. The support part supports a motor causing a disk to rotate around a central axis extending in an up-down direction. The bottom plate part spreads from the support part to a radially outer side. The wall part stands up from an outer peripheral part of the bottom plate part. The wall part includes a first wall part, and a second wall part located above the first wall part. The first wall part includes a first wall surface that encloses the disk from the radially outer side, and a support surface that spreads from an upper end of the first wall surface to the radially outer side. The second wall part includes a second wall surface located on the radially outer side of the first wall surface, and a recess that is recessed to the radially outer side from the second wall surface. The recess is defined by a space enclosed by a recess wall surface, a recess top surface, and a recess support surface. The recess wall surface is located on the radially outer side of the second wall surface and extends upward from the support surface. The recess top surface connects from an upper end of the recess wall surface to a lower end of the second wall surface. The recess support surface is a portion of the support surface that faces the recess top surface in an axial direction.

A disk drive device according to an exemplary embodiment of the disclosure includes the base plate described above, a first cover part arranged at an upper part of the base plate, and a seal member. The seal member is arranged on the support surface including the recess support surface. A radially outer end of the first cover part is connected to the support surface via the seal member.

The above and other elements, features, steps, characteristics and advantages of the present disclosure will become more apparent from the following detailed description of the preferred embodiments of the disclosure with reference to the attached drawings.

DETAILED DESCRIPTION

Exemplary embodiments of the disclosure will be described with reference to the drawings.

In this specification, a direction in which a central axis A1 of a disk D extends will be referred to as an "axial direction", one side in the axial direction will be defined as an upper side, and the other side in the axial direction will be defined as a lower side. A swing axis A2 of a head 40 extends in the same direction as the central axis A1. At each component, a surface facing the upper side will be referred to as an "upper surface", and a surface facing the lower side will be referred to as a "lower surface". This definition of the up-down direction does not limit the actual orientation and positional relationship of each component.

In this specification, a direction orthogonal to the central axis A1 will be referred to as a "radial direction". Further, an orientation away from the central axis A1 will be referred to as a "radially outer side", and an orientation approaching the central axis A1 will be referred to as a "radially inner side".

Figure 1:
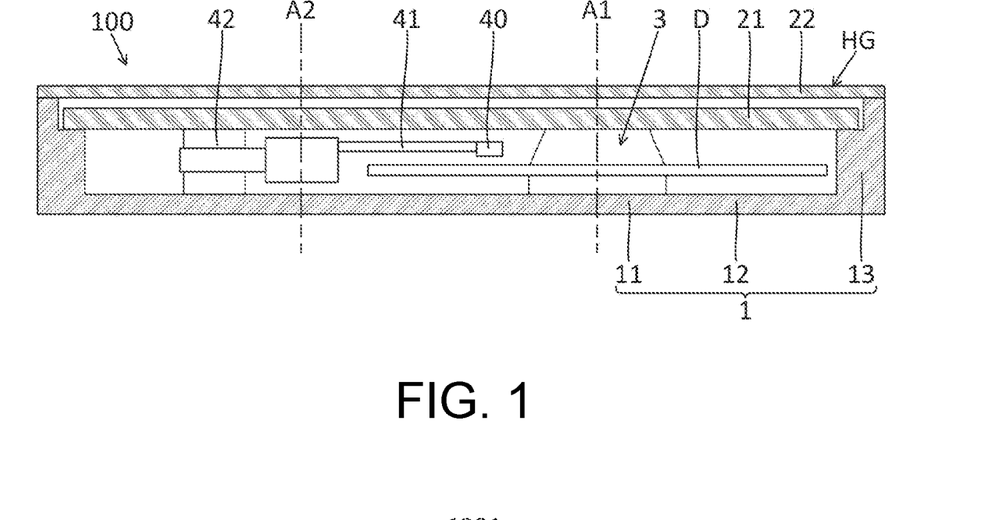
FIG. 1 is a schematic view showing an internal structure of a disk drive device according to an embodiment.

FIG. 1 is a schematic view showing an internal structure of a disk drive device 100 according to an embodiment.

The disk drive device 100 is a hard disk drive (HDD). The disk drive device 100 includes a disk D as a storage medium. The disk drive device 100 includes a housing HG that includes a base plate 1 to be described later. The housing HG has a space therein. The disk D is arranged in the internal space of the housing HG. The disk drive device 100 performs reading and writing of information from and to the disk D while rotating the disk D around the central axis A1.

The housing HG includes a base plate 1. Further, the housing HG includes a first cover part 21. That is, the disk drive device 100 includes the base plate 1 and the first cover part 21. The base plate 1 has a box shape or substantially box shape with an opened upper part. The first cover part 21 is connected to the base plate 1. The first cover part 21 is arranged at the upper part of the base plate 1. Accordingly, the opening at the upper part of the base plate 1 is covered by the first cover part 21.

The housing HG has a space enclosed by the base plate 1 and the first cover part 21 as an arrangement region of the disk D. A gas with a density lower than air is filled in the internal space of the housing HG in which the disk D is arranged. The gas filled in the internal space of the housing HG is, for example, helium gas. The gas filled in the internal space of the housing HG is not particularly limited. The gas filled in the internal space of the housing HG may also be hydrogen gas.

The housing HG includes a second cover part 22. That is, the disk drive device 100 includes the second cover part 22. The second cover part 22 is connected to the base plate 1. The second cover part 22 is arranged above the first cover part 21. As a modification example, the second cover part 22 may be omitted from the disk drive device 100.

The disk drive device 100 includes a motor 3. The motor 3 is, for example, a spindle motor. The disk D is fixed to the motor 3. The disk D rotates by the driving force of the motor 3.

The disk drive device 100 includes a head 40. Further, the disk drive device 100 includes an arm 41 and a swing mechanism 42. The head 40 is fixed to a tip part of the arm 41.

The arm 41 is supported to be capable of swinging around the swing axis A2. The swing mechanism 42 causes the arm 41 to swing. By swinging around the swing axis A2, the head 40 moves relatively with respect to the disk D. The head 40 performs reading and writing of information from and to the disk D.

Figure 2:
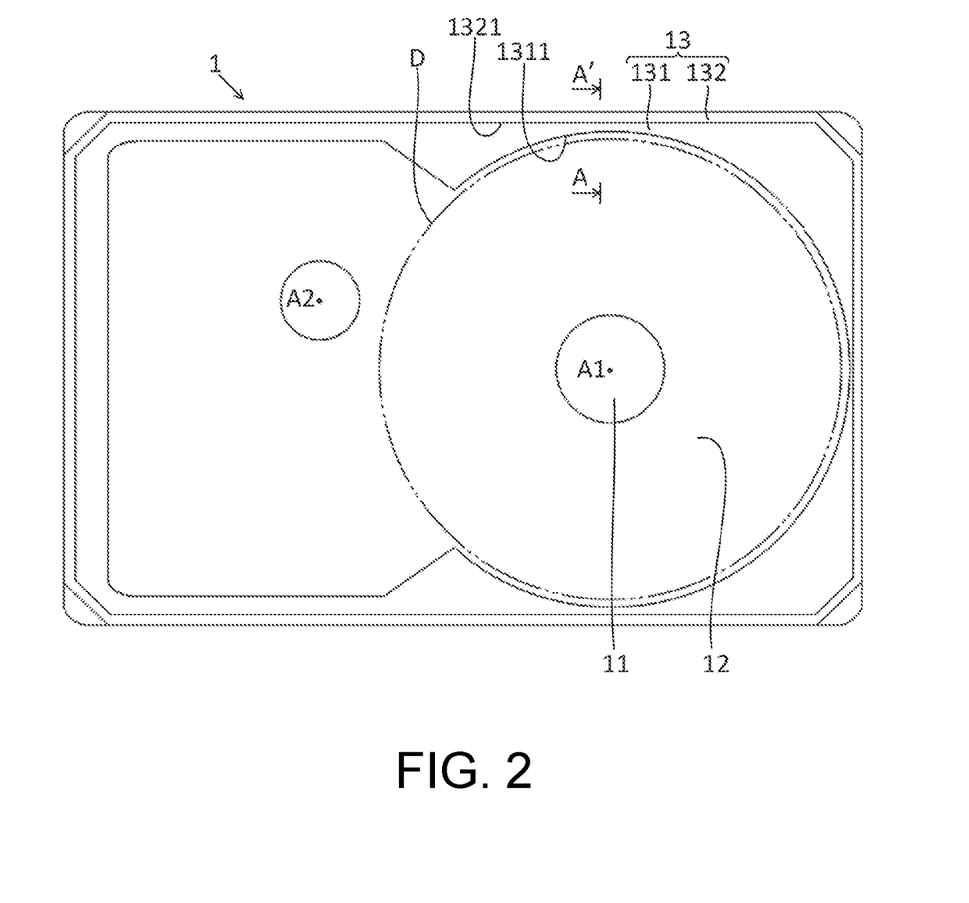
FIG. 2 is a plan view of a base plate according to an embodiment as viewed from above.
Figure 3:
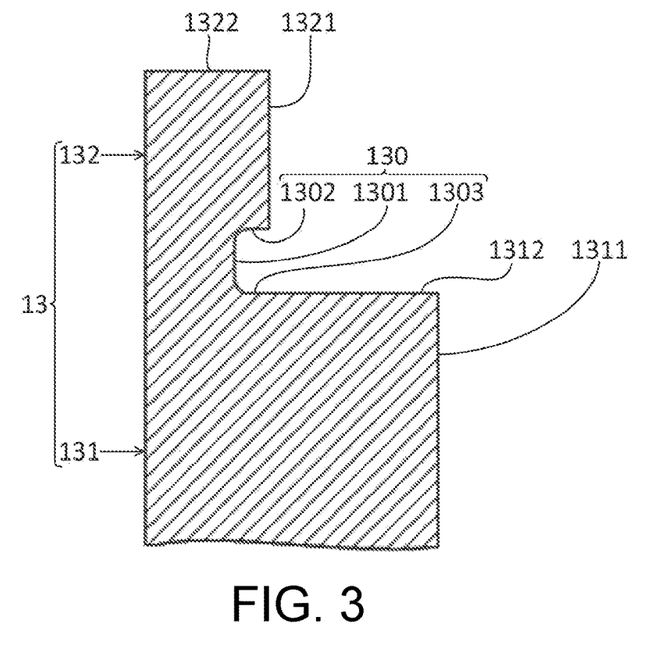
FIG. 3 is a cross-sectional view of connection spots of a first cover part and a second cover part to the base plate according to an embodiment.
Figure 4:
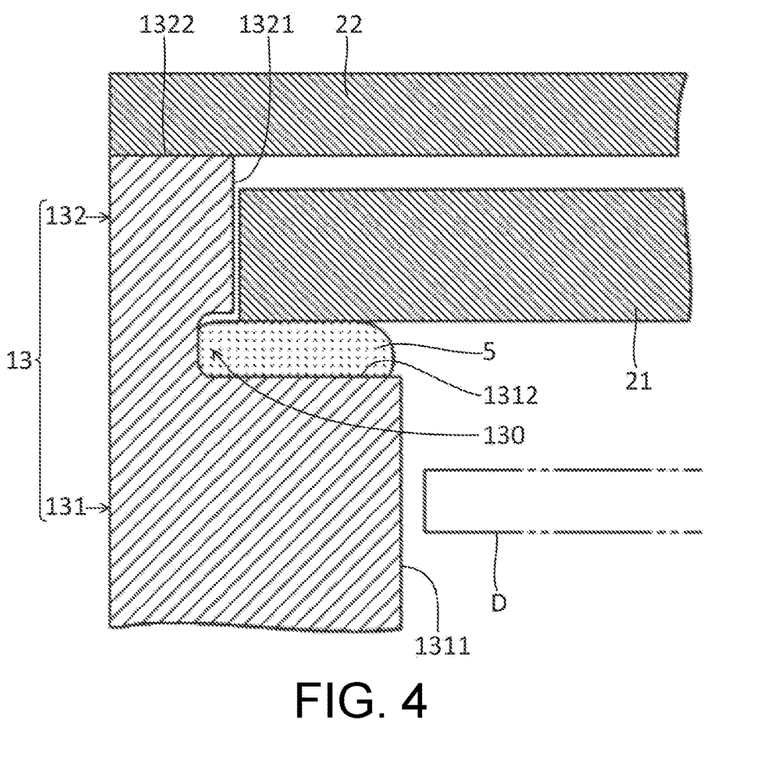
FIG. 4 is a cross-sectional view of a state in which the first cover part and the second cover part are connected to the connection spots shown in FIG. 3.

FIG. 2 is a plan view of the base plate 1 according to an embodiment viewed from above. In FIG. 2, an outer edge of the disk D is shown by a double-dot dashed line. FIG. 3 is a cross-sectional view of connection spots of the first cover part 21 and the second cover part 22 to the base plate 1 according to an embodiment. FIG. 4 is a cross-sectional view of a state in which the first cover part 21 and the second cover part 22 are connected at the connection spots shown in FIG. 3. FIG. 3 and FIG. 4 correspond to cross-sections along line A-A' in FIG. 2. In FIG. 3 and FIG. 4, the left direction of the figures is the radially outer side, and the right direction of the figures is the radially inner side. In FIG. 4, illustration of symbols is partially omitted by referring to symbols shown in FIG. 3.

The base plate 1 defines a part of the housing HG of the disk drive device 100. The base plate 1 is a casting. The metal serving as the material of the base plate 1 is, for example, aluminum or an aluminum alloy.

As shown in FIG. 2, the base plate 1 includes a support part 11, a bottom plate part 12, and a wall part 13.

The support part 11 supports the motor 3. The motor 3 causes the disk D to rotate around the central axis A1 which extends in the up-down direction. That is, the support part 11 supports the disk D with the disk D being capable of rotating around the central axis A1.

Specifically, the motor 3 includes a hub and a shaft. The shaft is arranged at a position overlapping with the central axis A1 and extends along the central axis A1. The shaft is supported to be capable of rotating around the central axis A1. The hub is fixed to the shaft and rotates together with the shaft. The disk D is fixed to the hub. Further, the motor 3 includes a bearing and a stator. The bearing and the stator are fixed to the support part 11. The bearing supports the shaft rotatably. The stator faces a magnet fixed to the hub in the radial direction and causes the hub to rotate around the central axis A1. With the hub rotating, the disk D rotates.

The bottom plate part 12 spreads to the radially outer side from the support part 11. In other words, the support part 11 defines a part of the bottom plate part 12. The bottom plate part 12 has a rectangular shape or substantially rectangular shape with one direction as a long direction when viewed from the axial direction. The central axis A1 is located on one side in the long direction of the bottom plate part 12 when viewed from the axial direction. The swing axis A2 is located on the other side opposite to the one side in the long direction of the bottom plate part 12 when viewed from the axial direction.

The wall part 13 stands up from an outer peripheral part of the bottom plate part 12. An opening is defined at the upper part of the base plate 1 by the wall part 13. The wall part 13 encloses the disk D from the radially outer side. That is, the disk D is arranged in a region enclosed by the wall part 13.

The wall part 13 has a step part in a cross-sectional view (see FIG. 3) cut by a plane including the central axis A1 and parallel to a short direction of the bottom plate part 12. In other words, the wall part 13 has two upper surfaces at different axial positions.

Specifically, the wall part 13 includes a first wall part 131 and a second wall part 132. The second wall part 132 is located higher than the first wall part 131. That is, the first wall part 131 stands up from the bottom plate part 12. The second wall part 132 stands up from the first wall part 131. Of the wall part 13, the lower side is the first wall part 131 and the upper side is the second wall part 132.

The first wall part 131 has a first wall surface 1311. The first wall surface 1311 is an inner wall surface of the first wall part 131 that faces the radially inner side. The first wall surface 1311 encloses the disk D from the radially outer side.

The second wall part 132 has a second wall surface 1321. The second wall surface 1321 is an inner wall surface of the second wall part 132 that faces the radially inner side. The second wall surface 1321 is located on the radially outer side of the first wall surface 1311. The second wall surface 1321 encloses a region above the arrangement region of the disk D from the radially outer side.

The first wall part 131 has a support surface 1312. The support surface 1312 spreads from an upper end of the first wall surface 1311 to the radially outer side. An upper end surface 1322 of the wall part 13 spreads from an upper end of the second wall surface 1321 to the radially outer side.

That is, the second wall part 132 has the upper end surface 1322. The support surface 1312 is the lower-side upper surface of the two upper surfaces constituting the step of the wall part 13. The upper end surface 1322 is the upper-side upper surface of the two upper surfaces constituting the step of the wall part 13.

As shown in FIG. 4, the first cover part 21 and the second cover part 22 are connected to the wall part 13. The first cover part 21 is connected to the support surface 1312. The second cover part 22 is connected to the upper end surface 1322.

A seal member 5 is used for the connection of the first cover part 21 to the support surface 1312. That is, the disk drive device 100 includes the seal member 5. The seal member 5 is, for example, obtained by curing a liquid gasket (Formed In Place Gasket (FIPG)).

The seal member 5 is arranged on the support surface 1312. Then, a radially outer end of the first cover part 21 is connected to the support surface 1312 via the seal member 5. Accordingly, the seal member 5 seals between the radially outer end of the first cover part 21 and the support surface 1312. For example, with the seal member 5 interposed between the radially outer end of the first cover part 21 and the support surface 1312, the radially outer end of the first cover part 21 is screwed to the support surface 1312.

A radially outer end of the second cover part 22 is welded to the upper end surface 1322. That is, the radially outer end of the second cover part 22 is connected to the upper end surface 1322. The connection between the radially outer end of the second cover part 22 and the upper end surface 1322 may be performed using, for example, a laser welding method.

By interposing the seal member 5 between the radially outer end of the first cover part 21 and the support surface 1312, it is possible to improve the sealing property between the radially outer end of the first cover part 21 and the support surface 1312. That is, it is possible to improve the airtightness of the housing HG. Furthermore, by arranging the second cover part 22 above the first cover part 21 and connecting the radially outer end of the second cover part 22 to the upper end surface 1322, it is possible to further improve the airtightness of the housing HG.

Figure 5:
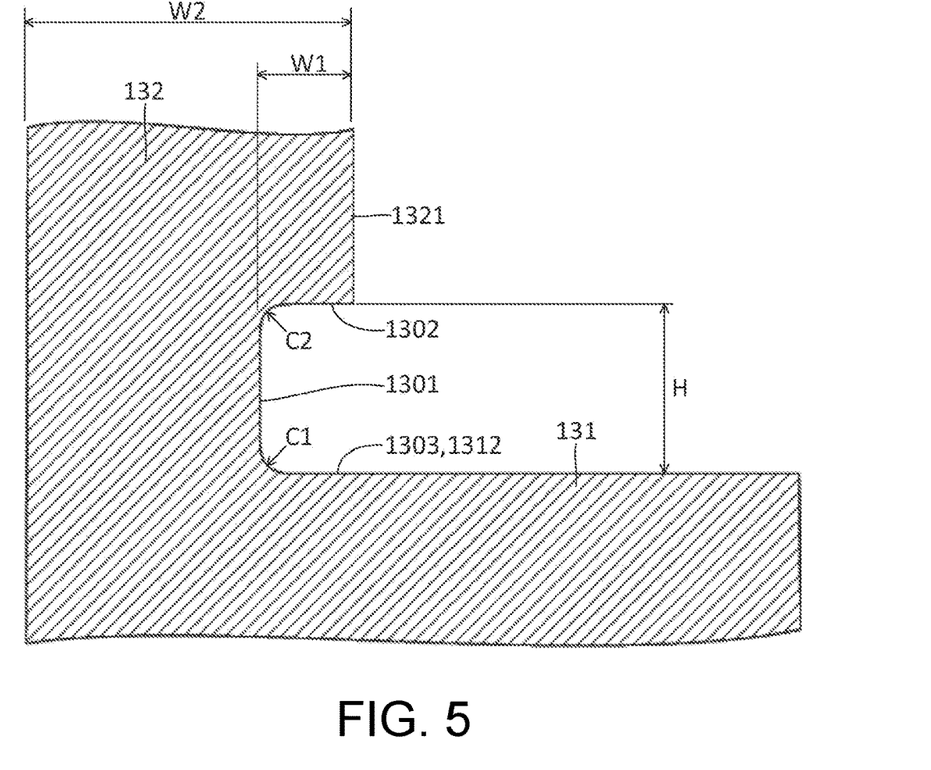
FIG. 5 is an enlarged cross-sectional view of a recess of the base plate and its vicinity according to an embodiment (cross-sectional view showing a corner according to a first configuration).

FIG. 5 is an enlarged cross-sectional view of a recess 130 of the base plate 1 and its vicinity according to an embodiment. FIG. 5 corresponds to a cross-section along line A-A' in FIG. 2. In FIG. 5, illustration of symbols is partially omitted by referring to symbols shown in FIG. 3.

The disk D of the disk drive device 100 faces the first wall surface 1311 with a gap in the radial direction (see FIG. 4). That is, the position of the first wall surface 1311 in the radial direction is determined based on a diameter of the disk D.

Upon an increase in the diameter of the disk D to increase the storage capacity of the disk drive device 100, the gap in the radial direction between the first wall surface 1311 and the disk D becomes smaller. If the gap in the radial direction between the first wall surface 1311 and the disk D becomes smaller, windage loss increases, leading to an increase in power consumption.

In the case of increasing the diameter of the disk D, the first wall surface 1311 is shifted to the radially outer side. That is, the gap in the radial direction between the first wall surface 1311 and the disk D is maintained at a certain level or more. Accordingly, it is possible to suppress an increase in power consumption resulting from windage loss.

However, simply shifting the first wall surface 1311 to the radially outer side reduces a width of the support surface 1312 in the radial direction. In other words, a width of an arrangement space of the seal member 5 becomes smaller in the radial direction. To put it another way, a contact area between the seal member 5 and the support surface 1312 becomes smaller. In the case where the contact area between the seal member 5 and the support surface 1312 becomes too small, compared to the case where the contact area between the seal member 5 and the support surface 1312 is sufficiently secured, there is a possibility that the sealing property between the radially outer end of the first cover part 21 and the support surface 1312 may decrease.

Thus, the second wall part 132 has a recess 130. The recess 130 is recessed to the radially outer side from the second wall surface 1321. Specifically, the recess 130 is defined by a space enclosed by a recess wall surface 1301, a recess top surface 1302, and a recess support surface 1303.

The recess wall surface 1301 is located on the radially outer side of the second wall surface 1321. The recess wall surface 1301 extends upward from the support surface 1312. The recess wall surface 1301 is a surface that faces the radially inner side.

The recess top surface 1302 connects from an upper end of the recess wall surface 1301 to a lower end of the second wall surface 1321. The recess top surface 1302 is a lower surface on the inner side of the recess 130. The recess top surface 1302 is a surface that faces the recess support surface 1303.

The recess support surface 1303 defines a part of the support surface 1312. The recess support surface 1303 defines a portion of the support surface 1312 that faces the recess top surface 1302 in the axial direction. In other words, a radially outer end of the support surface 1312 is the recess support surface 1303. The recess support surface 1303 is an upper surface on the inner side of the recess 130.

The support surface 1312 spreads in the radial direction without a step. In other words, the recess support surface 1303 and an upper surface of the other portion of the support surface 1312 are flush with each other. In other words, the recess support surface 1303 and the upper surface of the other portion of the support surface 1312 are connected without a step.

By providing the recess 130 in the second wall part 132, even if the first wall surface 1311 is shifted to the radially outer side, it is possible to suppress a decrease in the width of the support surface 1312 in the radial direction. In other words, it is possible to suppress a decrease in the contact area between the seal member 5 and the support surface 1312.

Specifically, in the manufacturing of the disk drive device 100, in a process of connecting the first cover part 21 to the wall part 13 of the base plate 1, a constituent material of the seal member 5 is arranged on the support surface 1312, and the radially outer end of the first cover part 21 is pressed against the support surface 1312. At this time, the constituent material of the seal member 5 is pressed and crushed to enter into the inner side of the recess 130 and reach the recess support surface 1303. In other words, the inner side of the recess 130 also serves as the arrangement space of the seal member 5.

Accordingly, even if the first wall surface 1311 is shifted to the radially outer side with the increase in the diameter of the disk D, it is possible to sufficiently secure the arrangement space of the seal member 5. In other words, it is possible to sufficiently secure the contact area between the seal member 5 and the support surface 1312. As a result, it is possible to suppress a decrease in the airtightness of the housing HG while suppressing an increase in windage loss (i.e., an increase in power consumption) accompanying the increase in the diameter of the disk D.

For example, in the process of connecting the first cover part 21 to the wall part 13 of the base plate 1, the constituent material of the seal member 5 reaches from the recess support surface 1303 to the recess wall surface 1301. As a result, the seal member 5 contacts at least a part of the recess wall surface 1301.

Further, a width W1 in the radial direction from the second wall surface 1321 to the recess wall surface 1301 is, for example, about 25% or less of a width W2 in the radial direction of the second wall part 132. The width W1 corresponds to a depth of the recess 130 in the radial direction. In other words, the depth of the recess 130 in the radial direction is, for example, about 25% or less of the width W2. By setting the width W1 to be about 25% or less of the width W2, even if the recess 130 is provided in the second wall part 132, that is, even if the radial thickness at a part of the second wall part 132 is reduced, it is possible to suppress a decrease in the strength of the second wall part 132.

The width W1 in the radial direction from the second wall surface 1321 to the recess wall surface 1301 is, for example, about 30 μm or more. Accordingly, it is possible to easily define the recess 130 in the second wall part 132.

Figure 6:
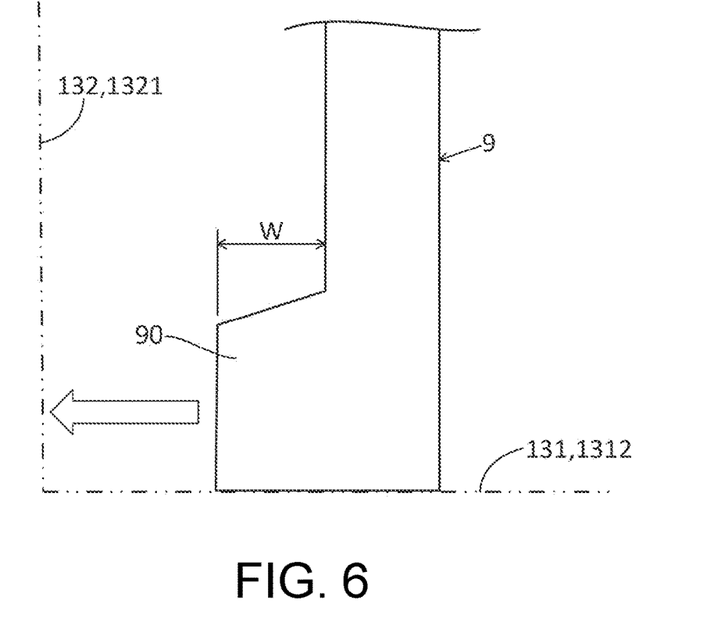
FIG. 6 is a schematic view of a knife used in manufacturing of the base plate according to an embodiment.

For example, in the formation of the recess 130, a knife 9 as shown in FIG. 6 is used. The knife 9 has a tip part 90 that protrudes in the radial direction. By pressing and cutting with the knife 9 against the material (indicated by a double-dot dashed line in FIG. 6) of the base plate 1 in a direction of a white arrow, the recess 130 is defined in the material of the base plate 1.

In the case of defining the recess 130 using such a knife 9, the width W1 of the recess 130 is set based on a width W of the tip part 90. The smaller the width W of the tip part 90 is, the smaller the width W1 of the recess 130 is able to be defined. However, it is difficult to reduce the width W of the tip part 90. Thus, it is preferable that the width W1 of the recess 130 is, for example, about 30 μm or more. If the width W1 of the recess 130 is about 30 μm or more, it is possible to define the recess 130 using the knife 9.

Further, as shown in FIG. 5, a width H in the axial direction between the recess support surface 1303 and the recess top surface 1302 is larger than the width W1 in the radial direction between the second wall surface 1321 and the recess wall surface 1301. In other words, an opening width (corresponding to the width H) of the recess 130 in the axial direction is larger than a depth (corresponding to the width W1) of the recess 130 in the radial direction. Accordingly, in the process of connecting the first cover part 21 to the wall part 13 of the base plate 1, when the constituent material of the seal member 5 is pressed and crushed by the first cover part 21, it is possible to easily cause the pressed and crushed constituent material of the seal member 5 to enter into the inner side of the recess 130.

The depth of the recess 130 in the radial direction is appropriately changed based on the position of the first wall surface 1311 in the radial direction. The position of the first wall surface 1311 in the radial direction is set based on the diameter of the disk D. That is, the depth of the recess 130 in the radial direction is appropriately changed based on the diameter of the disk D.

Figure 7:
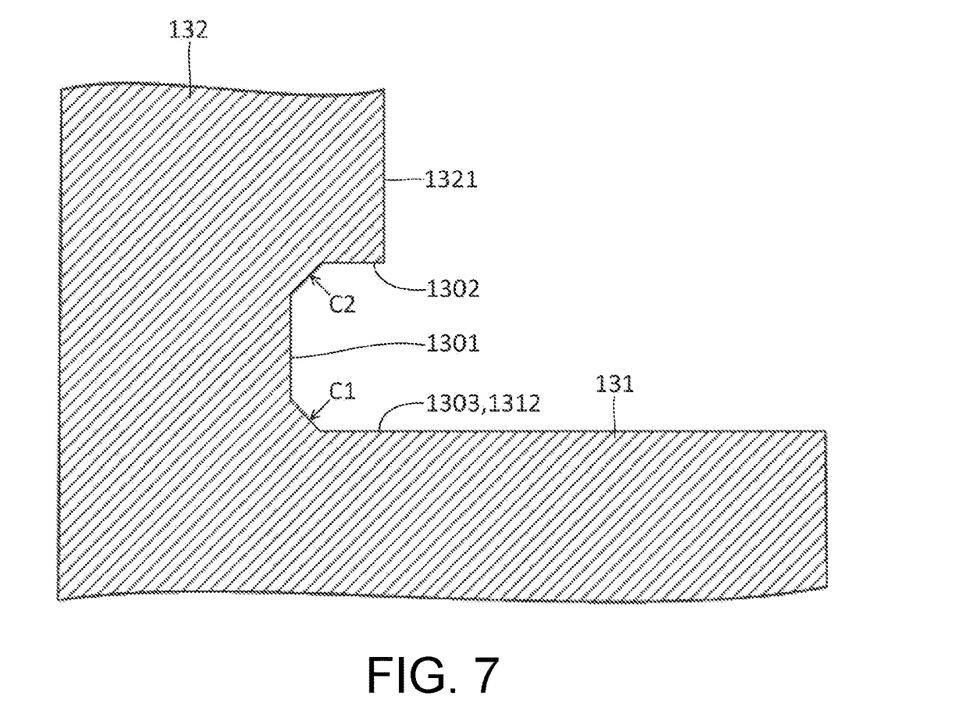
FIG. 7 is an enlarged cross-sectional view of the recess of the base plate and its vicinity according to an embodiment (cross-sectional view showing a corner according to a second configuration).

FIG. 7 is an enlarged cross-sectional view of the recess 130 of the base plate 1 and its vicinity according to an embodiment. FIG. 7 corresponds to a cross-section along line A-A' in FIG. 2. In FIG. 7, illustration of symbols is partially omitted by referring to symbols shown in FIG. 3.

Herein, FIG. 5 shows shapes of a first corner C1 and a second corner C2 according to a first configuration. FIG. 7 shows shapes of the first corner C1 and the second corner C2 according to a second configuration.

In the first configuration and the second configuration, the recess 130 has a first corner C1 and a second corner C2. The first corner C1 is a corner between the recess support surface 1303 and the recess wall surface 1301. The second corner C2 is a corner between the recess top surface 1302 and the recess wall surface 1301. Herein, at least one of the first corner C1 and the second corner C2 is inclined with respect to the radial direction and the axial direction.

In the first configuration, as shown in FIG. 5, both the first corner C1 and the second corner C2 are inclined in a curved shape or substantially curved shape. In the first configuration, it is also possible that only one of the first corner C1 and the second corner C2 is inclined in a curved shape or substantially curved shape. In the first configuration, it is preferable that at least the first corner C1 is inclined in a curved shape or substantially curved shape.

In the second configuration, as shown in FIG. 7, both the first corner C1 and the second corner C2 are inclined in a planar shape or substantially planar shape. In the second configuration, it is also possible that only one of the first corner C1 and the second corner C2 is inclined in a planar shape or substantially planar shape. In the second configuration, it is preferable that at least the first corner C1 is inclined in a planar shape or substantially planar shape.

In a configuration in which the first corner C1 between the recess support surface 1303 and the recess wall surface 1301 is inclined, it becomes easier to fill the constituent material of the seal member 5 into the first corner C1 in the process of connecting the first cover part 21 to the wall part 13 of the base plate 1. That is, it is possible to create a state in which the seal member 5 is closely adhered to the first corner C1 without any gap. Accordingly, adhesion of the seal member 5 to the recess support surface 1303 is improved. That is, a decrease in the airtightness of the housing HG is further suppressed.

In a configuration in which the first corner C1 between the recess support surface 1303 and the recess wall surface 1301 forms a right angle, it becomes difficult for the constituent material of the seal member 5 to enter the first corner C1 in the process of connecting the first cover part 21 to the wall part 13 of the base plate 1, so a gap may be created between the first corner C1 and the seal member 5. Thus, in an embodiment, it is preferable that the first corner C1 is inclined.

In the process of connecting the first cover part 21 to the wall part 13 of the base plate 1, the constituent material of the seal member 5 is arranged on the support surface 1312, and by pressing and crushing the constituent material of the seal member 5 against the first cover part 21, the constituent material of the seal member 5 flows to the radially outer side to reach the first corner C1. For example, depending on the size of the recess 130, the constituent material of the seal member 5 reaches the second corner C2, so in an embodiment, it is preferable that the second corner C2 is also inclined.

Figure 8:
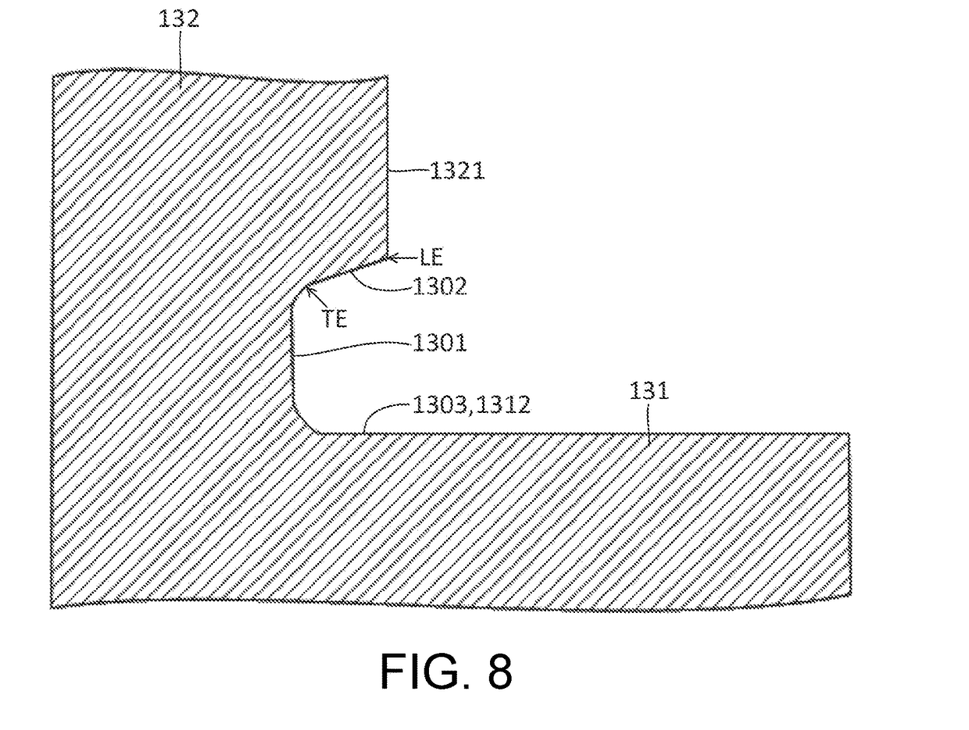
FIG. 8 is a cross-sectional view showing an opening shape (first configuration) of the recess of the base plate according to an embodiment.
Figure 9:
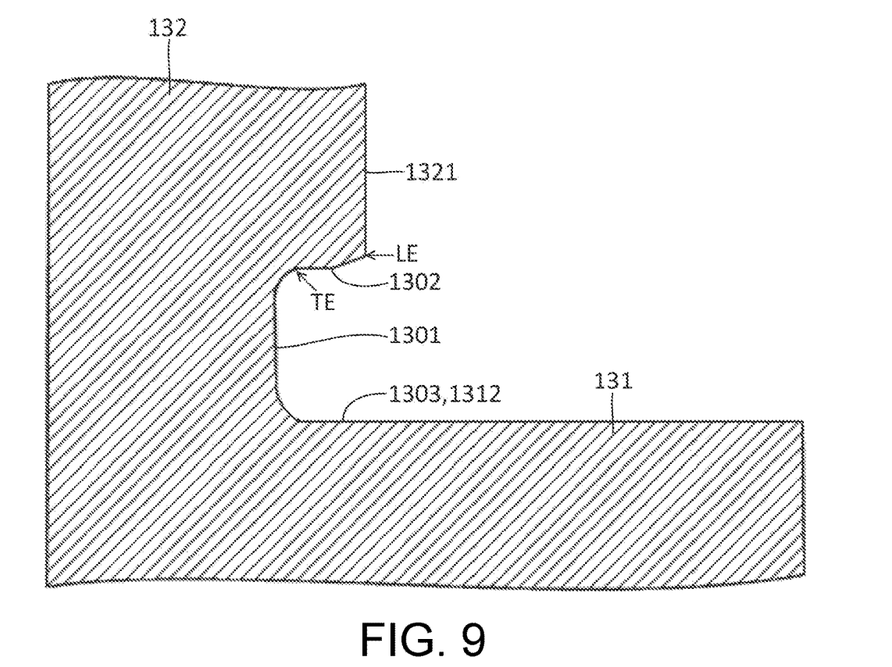
FIG. 9 is a cross-sectional view showing an opening shape (second configuration) of the recess of the base plate according to an embodiment.

FIG. 8 is a cross-sectional view showing an opening shape (first configuration) of the recess 130 of the base plate 1 according to an embodiment. FIG. 9 is a cross-sectional view showing an opening shape (second configuration) of the recess 130 of the base plate 1 according to an embodiment. FIG. 8 and FIG. 9 correspond to cross-sections along line A-A' in FIG. 2. In FIG. 8 and FIG. 9, illustration of symbols is partially omitted by referring to symbols shown in FIG. 3.

In both the first configuration and the second configuration, a lower end LE of the second wall surface 1321 is located higher than an upper end TE of the recess wall surface 1301. At least a part of the recess top surface 1302 has an inclined surface that is inclined upward and connects to the lower end LE of the second wall surface 1321. In FIG. 8 and FIG. 9, the inclined surface of the recess top surface 1302 is inclined in a planar shape or substantially planar shape, but the inclined surface of the recess top surface 1302 may be inclined in a planar shape or in a curved shape.

In the first configuration (see FIG. 8), the entire surface of the recess top surface 1302 is an inclined surface. In the second configuration (see FIG. 9), a part of the recess top surface 1302 is an inclined surface. In the second configuration, the recess top surface 1302 has an inclined surface on an opening side (i.e., radially inner side) of the recess 130 and has a surface parallel to the radial direction on a bottom side (i.e., radially outer side) of the recess 130.

In the process of connecting the first cover part 21 to the wall part 13 of the base plate 1, on the support surface 1312, the constituent material of the seal member 5 is pressed and crushed against the first cover part 21 to flow to the radially outer side. At this time, if at least a part of the recess top surface 1302 is an inclined surface, it is possible to suppress contact between the constituent material of the seal member 5 and the lower end LE of the second wall surface 1321. Accordingly, it is possible to suppress occurrence of a problem in which, despite providing the recess 130 in the second wall part 132, the constituent material of the seal member 5 does not sufficiently enter into the inner side of the recess 130.

In the manufacturing process of the base plate 1, cutting is performed on at least a part of the material (i.e., casting) of the base plate 1. Of the base plate 1, at least the support surface 1312 of the first wall part 131, and the second wall surface 1321 and the upper end surface 1322 of the second wall part 132 are defined by cutting the material. Similarly, the recess wall surface 1301, the recess top surface 1302, and the recess support surface 1303 of the recess 130 are also defined by cutting the material.

At least a part of an outer wall surface facing the radially outer side of the wall part 13 of the base plate 1 is defined by cutting the material. Specifically, at least gate marks and overflow marks are cut off from the casting that serves as the material of the base plate 1. Thus, the outer wall surface of the wall part 13 includes a machined surface that has been cut and a non-machined surface that remains the base material without cutting. The machined surface has a surface roughness smaller than the non-machined surface.

The support surface 1312 including the recess support surface 1303 is a machined surface defined by cutting. In other words, the support surface 1312 has a surface roughness smaller than the non-machined surface. To put it another way, the support surface 1312 has a surface roughness smaller than at least a part of the outer wall surface facing the radially outer side of the wall part 13. Specifically, the support surface 1312 has a surface roughness smaller than the base material portion (i.e., cast surface) of the outer wall surface of the wall part 13 that has not been cut.

By changing the machining conditions between the cutting of the outer wall surface of the wall part 13 and the cutting of the periphery of the recess 130 including the support surface 1312, the surface roughness of the support surface 1312 may be defined smaller than the surface roughness of the outer wall surface of the wall part 13. Accordingly, the surface roughness of the support surface 1312 becomes smaller than the machined surface of the outer wall face of the wall part 13.

In a configuration in which the surface roughness of the support surface 1312 is small, it is possible to suppress creation of fine gaps between the support surface 1312 and the seal member 5. That is, adhesion of the seal member 5 to the support surface 1312 is improved. Accordingly, it is possible to further improve the sealing property between the first cover part 21 and the support surface 1312.

Figure 10:
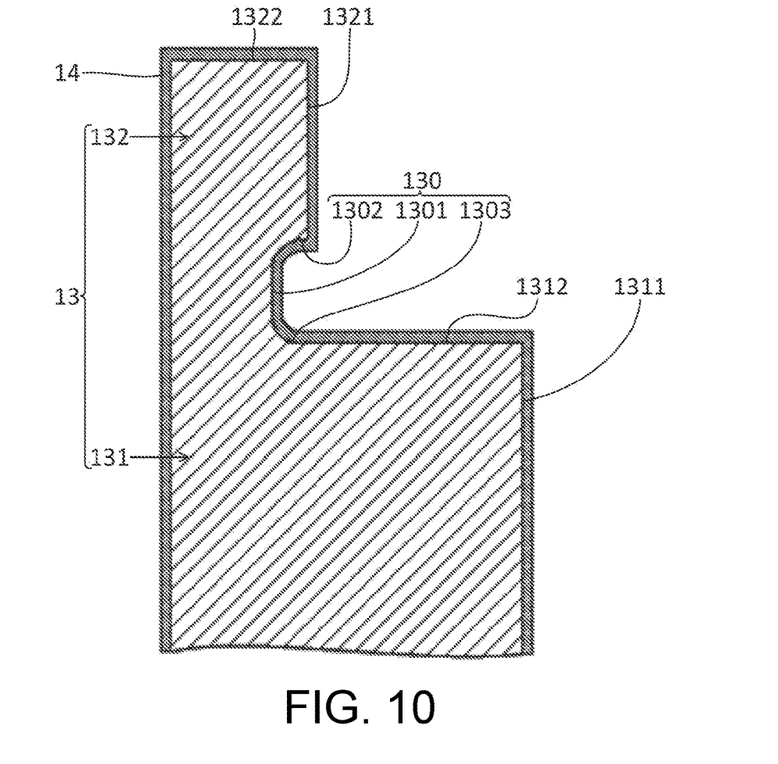
FIG. 10 is a cross-sectional view showing a state in which a wall part of the base plate according to an embodiment is covered with an electrodeposition coating film.
Figure 11:
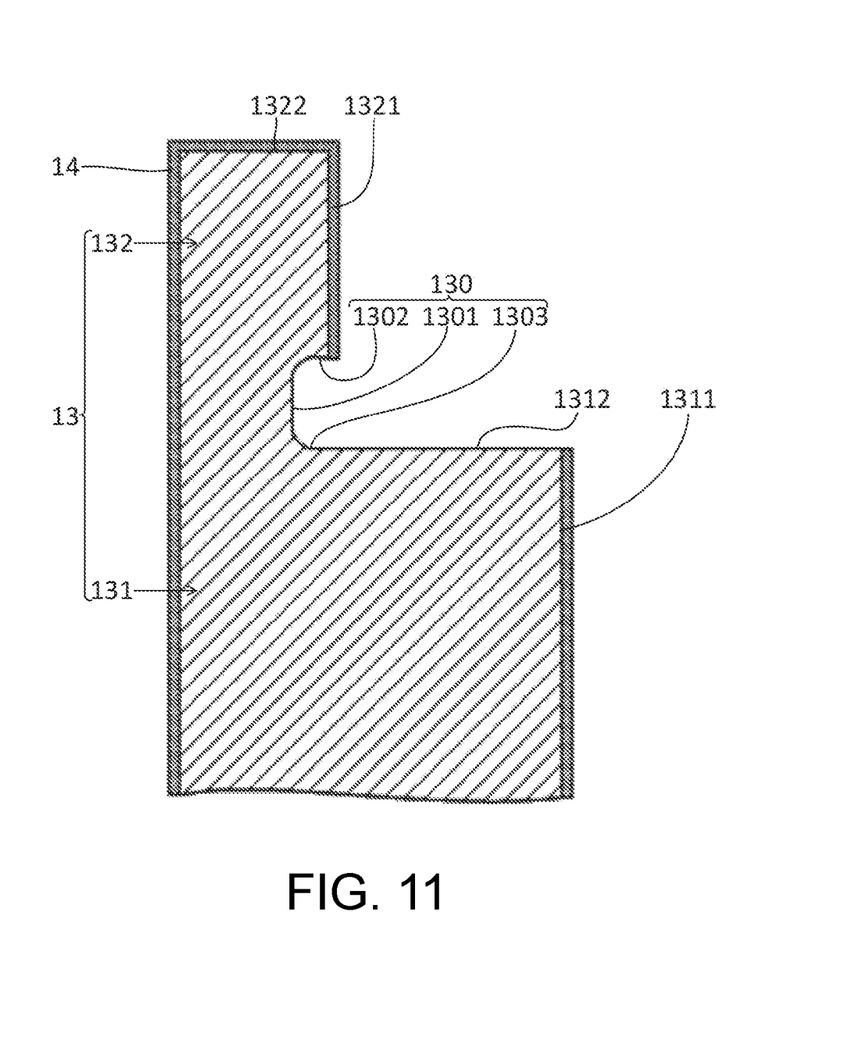
FIG. 11 is a cross-sectional view showing a state in which a part of the electrodeposition coating film shown in FIG. 10 is omitted.

FIG. 10 and FIG. 11 are cross-sectional views of a state in which the wall part 13 of the base plate 1 according to an embodiment is covered with an electrodeposition coating film 14. FIG. 11 is a cross-sectional view of a state in which a part of the electrodeposition coating film 14 shown in FIG. 10 is omitted. FIG. 10 and FIG. 11 correspond to cross-sections along line A-A' in FIG. 2. In FIG. 10 and FIG. 11, illustration of symbols is partially omitted by referring to symbols shown in FIG. 3.

At least a part of the surface of the base plate 1 is covered with the electrodeposition coating film 14. At least a part of the wall part 13 is a surface covered with the electrodeposition coating film 14. For example, electrodeposition coating may be applied to the entire surface of the base plate 1, and then a part of the electrodeposition coating film 14 may be removed by cutting.

Of the base plate 1, at least the support surface 1312 of the first wall part 131, the second wall surface 1321 and the upper end surface 1322 of the second wall part 132 are defined by cutting the casting serving as the material.

At the portion of the casting that has been cut, a chill layer is removed. Thus, a layer with a low metal density is exposed at the portion of the casting that has been cut. In other words, the machined surface is a surface with a low metal density.

Considering this, as shown in FIG. 10, the entire surface of the wall part 13 may be covered with the electrodeposition coating film 14. In the configuration shown in FIG. 10, the support surface 1312 including the recess support surface 1303, the recess wall surface 1301, and the recess top surface 1302 are covered with the electrodeposition coating film 14. Accordingly, it is possible to suppress a decrease in airtightness of the housing HG including the base plate 1.

Although details will be described later, in the manufacturing process of the base plate 1, an impregnant is applied to at least the machined surface. By applying an impregnant to the casting serving as the material of the base plate 1, it is possible to seal fine voids created in the material of the base plate 1 with the impregnant. The impregnant has a viscosity lower than the constituent material (i.e., electrodeposition coating material before curing) of the electrodeposition coating film 14. In other words, to suppress a decrease in airtightness of the housing HG, in an embodiment, it is preferable to actively apply an impregnant to the machined surface of the material of the base plate 1.

Thus, as shown in FIG. 11, the electrodeposition coating film 14 on each of the support surface 1312 including the recess support surface 1303, the recess wall surface 1301, and the recess top surface 1302 may be removed. In the configuration shown in FIG. 11, at least the support surface 1312 is exposed from the electrodeposition coating film 14. Accordingly, infiltration of the impregnant is actively performed on the portion of the base plate 1 contacted by the seal member 5. As a result, it is possible to further suppress a decrease in airtightness of the housing HG.

Figure 12:
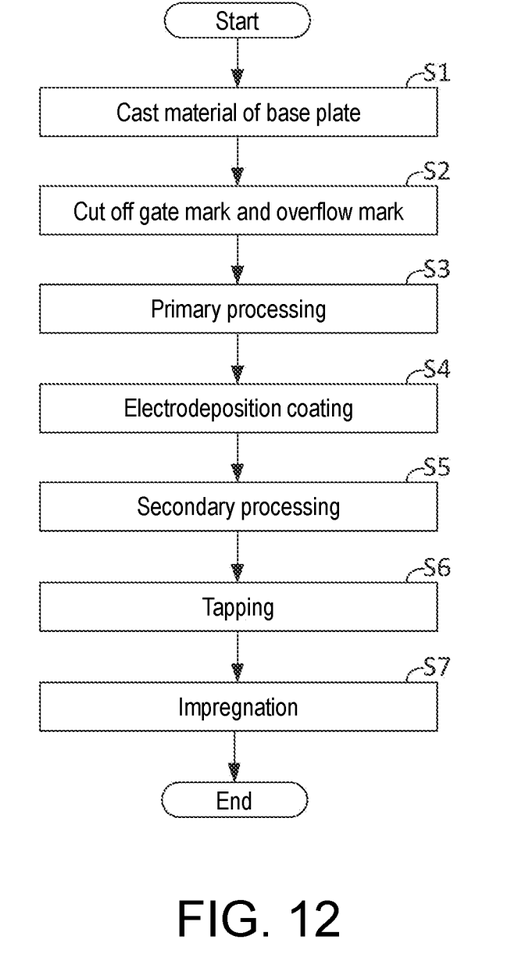
FIG. 12 is a flowchart showing a manufacturing process of the base plate according to an embodiment.

FIG. 12 is a flowchart showing a manufacturing process of the base plate 1 according to an embodiment. Hereinafter, with reference to FIG. 12, the manufacturing process of the base plate 1 will be described.

In step S1, molten metal is poured into a mold to define a casting which is the material of the base plate 1. In step S2, gate marks and overflow marks remaining on the casting are cut off. At this time, the gate marks and the overflow marks are not completely cut off.

In step S3, primary processing is performed on the casting. In the primary processing, cutting is performed at least on portions that will become the support surface 1312 of the first wall part 131, the second wall surface 1321 and the top end surface 1322 of the second wall part 132. Furthermore, by performing cutting, a portion that will become the recess 130 is defined. That is, the recess wall surface 1301, the recess top surface 1302, and the recess support surface 1303 are defined.

In step S4, electrodeposition coating is applied to the entire surface of the casting. However, the embodiment is not limited thereto. For example, when applying electrodeposition coating, the support surface 1312 including the recess support surface 1303 may be masked. Accordingly, it is possible to easily create a state in which at least the support surface 1312 is exposed from the electrodeposition coating film 14. Alternatively, after electrodeposition coating, in secondary processing of step S5 to be described later, the electrodeposition coating may be removed.

In step S5, secondary processing is performed on the casting. To obtain the configuration shown in FIG. 11, at least the support surface 1312 is exposed from the electrodeposition coating film 14 by performing the secondary processing. In an embodiment, it is preferable to actively impregnate the gate marks and the overflow marks with an impregnant in a subsequent impregnation process. Thus, in step S5, portions of the electrodeposition coating film 14 that cover the gate marks and the overflow marks are cut to expose the gate marks and the overflow marks.

In step S6, a tapping process is performed on the casting to define screw holes. At this time, screw holes for fixing the first cover part 21 to the base plate 1 are defined. Then, in step S7, an impregnation process is performed on the casting.

Features of the above-described preferred embodiments of the disclosure and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The disclosure may adopt configurations (1) to (11) below.

(1) A base plate which defines a part of a housing of a disk drive device, the base plate including:
   a support part that supports a motor causing a disk to rotate around a central axis extending in an up-down direction;
   a bottom plate part that spreads from the support part to a radially outer side; and
   a wall part that stands up from an outer peripheral part of the bottom plate part, in which the wall part includes:
      a first wall part; and
      a second wall part located above the first wall part,
   the first wall part includes:
      a first wall surface that encloses the disk from the radially outer side; and
      a support surface that spreads from an upper end of the first wall surface to the radially outer side,
   the second wall part includes:
      a second wall surface located on the radially outer side of the first wall surface; and
      a recess that is recessed to the radially outer side from the second wall surface, and
   the recess is defined by a space enclosed by:
      a recess wall surface that is located on the radially outer side of the second wall surface and extends upward from the support surface;
      a recess top surface that connects from an upper end of the recess wall surface to a lower end of the second wall surface; and
      a recess support surface which is a portion of the support surface that faces the recess top surface in an axial direction.

(2) The base plate according to (1), in which a width in a radial direction from the second wall surface to the recess wall surface is 25% or less of a width of the second wall part in the radial direction.

(3) The base plate according to (1) or (2), in which a width in a radial direction from the second wall surface to the recess wall surface is 30 μm or more.

(4) The base plate according to any one of (1) to (3), in which
   at least one of a first corner between the recess support surface and the recess wall surface and a second corner between the recess top surface and the recess wall surface is inclined with respect to a radial direction and the axial direction.

(5) The base plate according to any one of (1) to (4), in which
   the lower end of the second wall surface is located higher than the upper end of the recess wall surface, and
   at least a part of the recess top surface has an inclined surface that is inclined upward and connects to the lower end of the second wall surface.

(6) The base plate according to any one of (1) to (5), in which
   a width in the axial direction between the recess support surface and the recess top surface is larger than a width in a radial direction between the second wall surface and the recess wall surface.

(7) The base plate according to any one of (1) to (6), in which
   the support surface has a surface roughness smaller than at least a part of an outer wall surface of the wall part facing the radially outer side.

(8) The base plate according to any one of (1) to (7), in which
   the support surface including the recess support surface, the recess wall surface, and the recess top surface are covered with an electrodeposition coating film.

(9) The base plate according to any one of (1) to (7), in which
   at least a part of the wall part is a surface covered with an electrodeposition coating film, and
   at least the support surface is exposed from the electrodeposition coating film.

(10) A disk drive device including:
the base plate according to any one of (1) to (9);
a first cover part arranged at an upper part of the base plate; and
a seal member, in which
the seal member is arranged on the support surface including the recess support surface, and
a radially outer end of the first cover part is connected to the support surface via the seal member.
(11) The disk drive device according to (10), further including:
a second cover part arranged above the first cover part, in which
a radially outer end of the second cover part is connected to an upper end surface of the wall part.

The disclosure may be applied to disk drive devices such as hard disk drives, for example.

What is claimed is:

1. A base plate which defines a part of a housing of a disk drive device, the base plate comprising:
   a support part that supports a motor causing a disk to rotate around a central axis extending in an up-down direction;
   a bottom plate part that spreads from the support part to a radially outer side; and
   a wall part that stands up from an outer peripheral part of the bottom plate part, wherein
   the wall part comprises:
      a first wall part; and
      a second wall part located above the first wall part,
   the first wall part comprises:
      a first wall surface that encloses the disk from the radially outer side; and
      a support surface that spreads from an upper end of the first wall surface to the radially outer side,
   the second wall part comprises:
      a second wall surface located on the radially outer side of the first wall surface; and
      a recess that is recessed to the radially outer side from the second wall surface, and
   the recess is defined by a space enclosed by:
      a recess wall surface that is located on the radially outer side of the second wall surface and extends upward from the support surface;
      a recess top surface that connects from an upper end of the recess wall surface to a lower end of the second wall surface; and
      a recess support surface which is a portion of the support surface that faces the recess top surface in an axial direction.

2. The base plate according to claim 1, wherein
   a width in a radial direction from the second wall surface to the recess wall surface is 25% or less of a width of the second wall part in the radial direction.
3. The base plate according to claim 1, wherein
   a width in a radial direction from the second wall surface to the recess wall surface is 30 µm or more.
4. The base plate according to claim 1, wherein
   at least one of a first corner between the recess support surface and the recess wall surface and a second corner between the recess top surface and the recess wall surface is inclined with respect to a radial direction and the axial direction.
5. The base plate according to claim 1, wherein
   the lower end of the second wall surface is located higher than the upper end of the recess wall surface, and
   at least a part of the recess top surface has an inclined surface that is inclined upward and connects to the lower end of the second wall surface.
6. The base plate according to claim 1, wherein
   a width in the axial direction between the recess support surface and the recess top surface is larger than a width in a radial direction between the second wall surface and the recess wall surface.
7. The base plate according to claim 1, wherein
   the support surface has a surface roughness smaller than at least a part of an outer wall surface of the wall part facing the radially outer side.
8. The base plate according to claim 1, wherein
   the support surface including the recess support surface, the recess wall surface, and the recess top surface are covered with an electrodeposition coating film.
9. The base plate according to claim 1, wherein
   at least a part of the wall part is a surface covered with an electrodeposition coating film, and
   at least the support surface is exposed from the electrodeposition coating film.
10. A disk drive device comprising:
    the base plate according to claim 1;
    a first cover part arranged at an upper part of the base plate; and
    a seal member, wherein
    the seal member is arranged on the support surface including the recess support surface, and
    a radially outer end of the first cover part is connected to the support surface via the seal member.
11. The disk drive device according to claim 10, further comprising:
    a second cover part arranged above the first cover part, wherein
    a radially outer end of the second cover part is connected to an upper end surface of the wall part.

* * * * *